(12) United States Patent
Luecke et al.

(10) Patent No.: US 8,998,430 B2
(45) Date of Patent: Apr. 7, 2015

(54) LIGHT TRAP, COUPLING DEVICE FOR A BEAM PATH, AS WELL AS ILLUMINATION DEVICE AND OPTICAL OBSERVATION DEVICE

(75) Inventors: Christian Luecke, Oberkochen (DE); Peter Reimer, Ellwangen (DE)

(73) Assignee: Carl Zeiss Meditec AG, Jena (DE)

( * ) Notice: Subject to any disclaimer, the term of this patent is extended or adjusted under 35 U.S.C. 154(b) by 793 days.

(21) Appl. No.: 12/733,497

(22) PCT Filed: Aug. 26, 2008

(86) PCT No.: PCT/EP2008/006988
§ 371 (c)(1),
(2), (4) Date: Mar. 3, 2010

(87) PCT Pub. No.: WO2009/030404
PCT Pub. Date: Mar. 12, 2009

(65) Prior Publication Data
US 2010/0182681 A1    Jul. 22, 2010

(30) Foreign Application Priority Data
Sep. 3, 2007 (DE) .......................... 10 2007 041 792

(51) Int. Cl.
*G02B 27/00* (2006.01)
*G01N 21/64* (2006.01)
*G02B 21/08* (2006.01)
*G02B 5/00* (2006.01)
*G02B 5/20* (2006.01)

(52) U.S. Cl.
CPC .............. *G02B 21/082* (2013.01); *G02B 5/003* (2013.01); *G02B 5/205* (2013.01)

(58) Field of Classification Search
USPC ............ 359/385, 376, 739, 383, 614; 356/73, 356/497; 250/459.1, 461.1, 462.1
See application file for complete search history.

(56) References Cited

U.S. PATENT DOCUMENTS

| 4,185,902 | A | * | 1/1980 | Plaot ............................. 396/549 |
| 4,779,968 | A | * | 10/1988 | Sander .......................... 359/389 |
| 5,745,293 | A | | 4/1998 | Lassalle |
| 7,308,014 | B2 | * | 12/2007 | Eisenbarth et al. ............. 372/94 |
| 7,460,234 | B2 | * | 12/2008 | Larsen et al. .................. 356/436 |
| 2002/0021511 | A1 | | 2/2002 | Lee et al. |
| 2004/0069937 | A1 | * | 4/2004 | Tausch ........................... 250/226 |

FOREIGN PATENT DOCUMENTS

| DE | 27 25 107 B1 | 12/1978 |
| DE | 36 23 613 A1 | 1/1988 |
| DE | 40 16 166 A1 | 2/1991 |
| DE | 94 05 759 U1 | 6/1994 |
| EP | 0 363 762 A2 | 4/1990 |
| EP | 1 058 141 A2 | 12/2000 |

* cited by examiner

*Primary Examiner* — Suchin Parihar
*Assistant Examiner* — Tamara Y Washington
(74) *Attorney, Agent, or Firm* — Kriegsman & Kriegsman (57) ABSTRACT

A light trap, a device for coupling a first beam path to a second beam path, and an illumination device for an optical observation device, as well as an optical observation device. The light trap is for eliminating or preventing stray light, e.g., in the form of scattered light. In order to be able to further improve the elimination of disruptive stray light in the form of scattered light, the light trap is configured in a special way. It has a filter element, particularly a neutral filter element, which is characterized in that an incident light face of the filter element has a concave radius, whereby the incident light face has a specific curvature.

16 Claims, 11 Drawing Sheets

LIGHT TRAP, COUPLING DEVICE FOR A BEAM PATH, AS WELL AS ILLUMINATION DEVICE AND OPTICAL OBSERVATION DEVICE

The present invention first of all relates to a light trap for eliminating stray light. In addition, the invention relates to a device for coupling a first beam path to a second beam path, for example, an illumination beam path to an observation beam path. Finally, the invention also relates to an illumination device for an optical observation device as well as an optical observation device.

Optical observation devices are known in a great variety of designs. Optical observation devices may be designed, for example, as microscopes, e.g. stereomicroscopes, operating microscopes, or similar devices. These types of optical observation devices often have an illumination device. Such an illumination device usually produces at least one illumination beam path, which serves for illuminating an object to be investigated. The illumination beam path is often coupled to the observation beam path, this coupling being produced via a coupling device provided therefor. Here, the coupling device may have, for example, a corresponding deflecting element, for example, in the form of a beam splitter.

When an illumination beam path is coupled to an observation beam path and a beam splitter is used alone, the phenomenon occurs that the fraction of light from the illumination beam path that is not reflected at the beam splitter produces undesired scattered light, which is also called stray light. In an undesired manner, this scattered light enters the observation beam path, where, for example, it may lead to a reduction of the image contrast. Such a situation is indicated as an example in FIG. 1.

A great variety of measures have already been taken in the prior art in order to be able to eliminate stray light which has been produced in this way.

An illumination device for an operating microscope is described, for example, in DE 36 23 613 C2. In this case, an illumination beam path is also coupled to an observation beam path via a beam splitter. In order to reduce stray light according to this known solution, it is proposed to provide a light trap that absorbs light and is disposed next to the beam splitter. The light trap has the task of absorbing unreflected illuminating light originating from the illumination device and passing through the beam splitter. A solution that is similar to this is described in EP 0 363 762 B1.

A fluorescent microscope that also provides a device for producing an illumination beam is disclosed in EP 1 058 141 B1. The illumination beam is deflected via a beam splitter. In this case, an undesired component of the illuminating light is present, which is not reflected by the beam splitter, but rather passes through it. A light trap, which is designed in the form of a blackened rear wall, is in turn also provided in this known solution. The undesired portion of the illuminating light will be absorbed as completely as possible at the blackened rear wall.

The variants of a light trap indicated in the prior art, however, cannot be employed in all applications. Thus, for example, it is not possible to apply such light traps to the epi-illumination of a microscope, e.g., an operating microscope or a stereomicroscope in general. Light components of the illuminating light still always reach the observation beam path via the filter elements utilized due to the degree of residual reflections or via an objective element which involves, for example, the principal objective, found below the illumination coupling in the object space. Even small degrees of residual reflections are disruptive due to the high light intensity.

The object of the present invention is to take into account this circumstance and to provide solutions by means of which the elimination of disruptive stray light can be improved still further. In particular, solutions will be provided by means of which the disruptive stray light, which occurs when a coaxial epi-illumination is coupled to an observation beam path, typically via a beam splitter, can be mostly prevented from arising in the first place.

This object will be achieved according to the invention by the light trap with the features according to the independent patent claim 1, the device for coupling a first beam path to a second beam path (coupling device) with the features according to the independent patent claim 4, the illumination device for an optical observation device with the features according to the independent patent claim 11, as well as the optical observation device with the features according to the independent patent claim 13. Further features and details of the invention can be taken from the subclaims, the description and the drawings.

Here, features and details that are described in connection with the light trap according to the invention are also valid, of course, in connection with the coupling device according to the invention, the illumination device according to the invention, as well as the observation device according to the invention; features and details that are described in connection with the coupling device according to the invention are also valid, of course, in connection with the light trap according to the invention, as well as the illumination device and the observation device according to the invention; features and details that are described in connection with the illumination device according to the invention are also valid, of course, in connection with the light trap according to the invention, the coupling device according to the invention, as well as the observation device according to the invention; and features and details that are described in connection with the observation device according to the invention are also valid, of course, in connection with the light trap according to the invention, the coupling device according to the invention, as well as the illumination device according to the invention, so that reference is made to the full extent alternatively to other aspects of the invention when one aspect of the invention is discussed.

The individual aspects of the invention share the common basic concepts that can be achieved by a special configuration of the light trap, i.e., emergent stray light, which particularly involves undesired scattered light, which arises in passage through a deflecting element, e.g., a beam splitter, can be prevented in a particularly efficient way. The light trap thus serves particularly for extinguishing scattered light.

According to the first aspect of the invention, a light trap is provided for eliminating stray light and this trap has a filter element, in particular, a neutral filter element. The light trap is first characterized according to the invention in that the incident light face of the filter element has a concave radius.

Stray light that arises can be eliminated by this configuration in a particularly effective manner, or the emergence of stray light can be prevented.

Such a light trap can be used in a large variety of devices. This type of light trap can be used particularly advantageously in optical observation devices that may involve microscopes for example, stereomicroscopes for example, e.g., in the form of operating microscopes for ophthalmic surgery or similar devices. Of course, the invention is not limited to use in the mentioned devices.

In order to eliminate stray light, a filter element is used. Such a filter element may involve a neutral filter, for example. A neutral filter generally involves a light filter for the uniform dimming of light, particularly in a broad spectral range. These types of filter elements, as well as their use as light traps, are basically already known in the prior art.

The core of the present invention now consists of the fact that the filter element has a special configuration, this special configuration leading to the fact that the stray light that is formed can be effectively eliminated.

It is provided according to the invention that the filter element has an incident light face that has a concave radius. This means that the incident light face of the filter element has a curved structure. The incident light face thus has a curvature or recess directed inwardly into the filter element.

Advantageously, the filter element of the light trap has a spherically curved incident light face.

The light, which is reflected based on the degree of residual reflections of the incident face of the filter element, is collimated by the concave radius and can then be deflected to a site where it is not disruptive. Preferably, the curvature is selected in such a way that the light spot that arises is as small as possible. The incident light face of the filter element is thus formed for the collimation of the reflected light. How this is accomplished will be explained in more detail in the further course of the description. By means of the collimation, no additional scattered light arises due to other optical or mechanical components.

The value for the concave radius of the incident light face and the curvature of the incident light face resulting therefrom can be different, depending on the field of use and the application of the light trap. In particular, the degree of curvature is also dependent on the space ratios within the device in which the light trap is disposed, on the acceptable size of the light spot or the extent of the path upon which the light, which is reflected from the incident surface of the filter element and which is collimated by the concave radius, can/must be bent back to the site where it is not disruptive.

It is provided according to the invention that the radius of curvature of the incident light face lies in the range of 25 mm to 200 mm. It is preferably provided that the radius of curvature of the incident light face lies in the range of 45 mm to 110 mm.

The configuration of the light trap according to the invention makes it possible for the remainder of the light, particularly the illuminating light which is reflected by the light trap, to be deflected to a specific site, for example, to a diaphragm, and this site lies close enough in the region of the light trap, particularly in the region of the incident light face of the filter element, that the light trap can even be integrated in regions with only a small amount of available structural space, e.g., in an optical observation device. Further details in this respect are explained more fully in the further course of the description.

It is preferably provided that the filter element has an absorption material (for example, Schott Neutral filter NG 1), at least in regions, or that at least the incident light face is provided with an absorption material, at least in regions. This material, for example, may be vacuum-deposited layers in the case of mineral glasses (for example, such as the layer 'Umbra' in the case of Zeiss sunglasses), or organic glasses colored in a dipping bath (for example, Zeiss Clarlet Uni) or the like.

It is advantageously provided in this case that the filter element has a high degree of absorption of more than/equal to 80%. In the case of a degree of absorption of 99.9% (NG1), it is assured that the light which is transmitted by the concave surface of the filter element is practically completely absorbed at its second surface and only marginally small intensities, which are no longer disruptive, pass through the filter. Light reflected at the second surface of the filter element is still subjected once more to the same absorption, so that a degree of absorption of 80% is basically sufficient.

The light trap preferably can be disposed at or in an uptake device for the light trap. Advantageously, the uptake for the light trap can be provided at/in the light trap uptake device in such a way that a good thermal contact exists between the light trap and the light trap uptake device. In other words, it can be advantageously provided that the light trap is thermally coupled to the light trap uptake device. For example, the light trap can be bonded with the light trap uptake device, e.g., the trap can be glued into it.

A light trap according to the invention can be used in the most diversified ways.

According to a second aspect of the invention, a device is provided for coupling a first beam path to a second beam path, having a deflecting element and a light trap provided in the region of the deflecting element, which is characterized by the fact that the light trap is designed in the manner according to the invention, as described above.

The invention is not limited to specific embodiments for the deflecting element. For example, the deflecting element can be designed as a beam splitter, as a beam-splitting plate, as a partially transparent mirror, as a beam-splitting prism or the like. If the deflecting element is designed as a partially transparent mirror, it can be advantageously designed as a physical and/or geometric splitter.

The light trap is preferably provided in the region of the deflecting element, so that the light trap is disposed after the deflecting element—in the beam direction.

Preferably, the light trap can be tilted in at least one plane, preferably in two planes. Usually, the components (deflecting element and light trap) are disposed along an axis, which can be the optical axis. The tilting of the light trap can then be carried out relative to this axis. In the simplest case, it may be provided that the light trap is tilted in at least one plane. Preferably, it is provided, however, that the light trap is tilted in two planes. Tilting occurs preferably at the summit of the concave incident face of the filter element, in fact about the tangential and/or sagittal plane. The incident light face of the filter element of the light trap has the curvature described further above. Advantageously, the incident light face can be spherically curved. Light strikes the surface of the incident light face and is partially reflected therefrom. Advantageously, the light trap can be tilted in the X/Z plane, i.e., up or down. Tilting is then produced at a specific angle relative to the optical axis of the light striking the incident light face of the filter element. The surface normal line at the striking point is then tilted up or down by a specific angle relative to the optical axis. A different tilting can be produced in a similar way in the X/Y direction, which then corresponds to a tilting to the left or right.

In such an embodiment, the light, which is reflected based on the degree of residual reflections from the incident face of the light trap, is collimated by means of the concave radius of the filter element and is deflected to a suitable site where it is not disruptive via the tilting of the light trap—preferably in two planes. This site may involve, for example, a site inside a housing or a similar site.

Advantageously, the filter element of the light trap is designed or disposed in such a way that light rays reflected back from the incident light face of the filter element travel past the deflecting element. In this way, light that is reflected from the light trap can be prevented from passing through the deflecting element again. It is achieved by this advantageous embodiment that the illuminating light passes through the deflecting element only once. Light, which is reflected back from the light trap, is reflected so that it no longer passes through the deflecting element.

In another embodiment, the coupling device can have a surface element for focussing the light reflected from the incident light face of the filter element. The surface element can be designed in different ways. For example, it may involve a diaphragm, advantageously a metal diaphragm, which is preferably designed in the form of a black diaphragm. This surface element is allotted to the light trap. Illuminating light, which reaches the light trap through the deflecting element, as long as it is not absorbed by the light trap, is deflected to the surface element.

The light trap has a filter element with a curved incident light face, as has been described further above. Advantageously, the incident light face can be spherically curved. It is advantageously provided that the distance between the filter element of the light trap and the surface element, for example, a diaphragm, is selected so that the focal point of light reflected from the incident light face of the filter element lies on the surface element. On the one hand, this depends on the radius of curvature of the incident light face of the filter element, and on the other hand, on the distance between the filter element and the surface element, particularly on the distance from the focal point to the surface of the filter element. In this case, that point on the surface of the incident light face of the filter element at/in which the light strikes the incident light face of the filter element is particularly important. In other words, this is the site at which the optical axis of the light striking the incident light face of the light trap passes through the surface of the incident light face of the light trap.

Advantageously, for a radius of curvature r, the distance between the focal point, which preferably lies on the surface element, and the point on the surface of the incident light face of the filter element, at/in which the light strikes the incident light face of the filter element amounts to r/2. The steeper the curvature of the light trap is, the closer the focal point is to the light trap, and consequently, the shorter the distance is between the focal point and the light trap. In this way, the structural space required can be reduced advantageously.

In such a case, the form of the surface of the filter element of the light trap, i.e., its curvature, is advantageously selected in such a way that the illuminating light, which strikes the light trap, is reflected only to the surface element, for example, the diaphragm.

The coupling device can preferably be designed as a device for coupling an illumination beam path to an observation beam path, in particular, for coupling a coaxial epi-illumination to an observation beam path.

According to another aspect of the invention, an illumination device is provided for an optical observation device, in particular for a microscope having a device for producing at least one illumination beam path and having a device for coupling at least one illumination beam path to at least one observation beam path. The illumination device is characterized by the fact that the coupling device is designed for coupling a first beam path to a second beam path, that the coupling device has a deflecting element and a light trap provided in the region of the deflecting element, that the light trap has a filter element, particularly a neutral filter element, and that the incident light face of the filter element has a concave radius.

The illumination device is advantageously characterized by the fact that the coupling device is designed in the manner according to the invention, as described above.

In such an embodiment, the coupling device represents a component of the illumination device.

The illumination device can be advantageously designed for generating a coaxial epi-illumination.

The light trap according to the invention as described above, the coupling device as described above, or the illumination device according to the invention as described above are advantageously components of an optical observation device.

According to another aspect of the invention, an optical observation device is provided, in particular a microscope having a base body and an illumination device, which provides at least one illumination beam path to a deflecting element, which deflects the illuminating light through an objective element to an object plane. According to the invention, the optical observation device is characterized by the fact that the illumination device is designed in a way as described above.

Such an optical observation device, for example, an operating microscope with a base body, contains an illumination system, which provides an illumination beam path to a deflecting element, e.g., a beam splitter, which deflects the illuminating light through the objective element, for example, the principal objective of the microscope, to the object region. At least one observation beam path of the operating microscope passes through the deflecting element. The illuminating light, which is not deflected from the deflecting element to the object region, reaches the light trap.

According to the present invention, in addition, an optical observation device, in particular a microscope, is provided, having at least one observation beam path, having an illumination device for generating at least one illumination beam path and having a device for coupling at least one illumination beam path to at least one observation beam path. The optical observation device is then characterized by the fact that the coupling device is designed in the manner according to the invention, as described above.

The optical observation device advantageously involves a microscope, e.g., an operating microscope for ophthalmic surgery, or, in general, a stereomicroscope, or similar microscope.

The illumination device can be advantageously designed for generating a coaxial epi-illumination.

Also, the coupling device can preferably be designed for coupling a coaxial epi-illumination to at least one observation beam path.

The optical observation device advantageously has an objective element, which may involve, for example, the principal objective. Preferably, the coupling device can be provided above the objective element. Of course, the optical observation device can also provide additional optical elements, such as at least one tube, at least one eyepiece, or similar elements.

The light trap of the coupling device of the illumination device can preferably be thermally coupled to the base body of the optical observation device. The light trap can be disposed, for example, in an uptake device for the light trap and is then in good thermal contact with it. In turn, the light trap is rigidly joined with the base body of the optical observation device, for example, via the light trap uptake device—for example, by fastening screws. This measure provides that the light trap is thermally coupled to the base body of the optical observation device. The heat, which is triggered by the illuminating light striking the light trap, can be easily drawn off in this way into the base body of the optical observation device.

In another embodiment, the surface element of the coupling device can be provided in the region of the objective element of the optical observation device. The illuminating light, which reaches the light trap through the deflecting element, as long as it is not absorbed by the light trap, is deflected to the surface element, for example, a metal diaphragm. It can be provided advantageously that the surface element partially covers the objective element. In this way, one avoids disruptive reflections at the objective element due to light that is reflected by the light trap.

Advantageous features of the present invention are the following:

1) A high curvature of the light trap. This measure makes it possible that the illuminating light, which is reflected by the light trap, in the tight structural space available in the optical observation device, e.g., in the operating microscope, reaches the surface element, for example, the black metal diaphragm in its entirety, i.e., it is focussed onto a relatively small space.

2) Focussing the illuminating light reflected by means of the light trap onto a surface, for example, in the form of a black metal diaphragm, which is preferably disposed above the principal objective of the microscope and which, for example, partially covers the principal objective of the microscope.

3) Uptake of the light trap in a light trap holder, such that a good thermal contact is made between the light trap and the light trap holder, the light trap holder in turn being joined to the base body of the optical observation device for good heat conduction.

The invention will now be explained in more detail on the basis of embodiment examples with reference to the appended drawings. Here.

Figure 1:
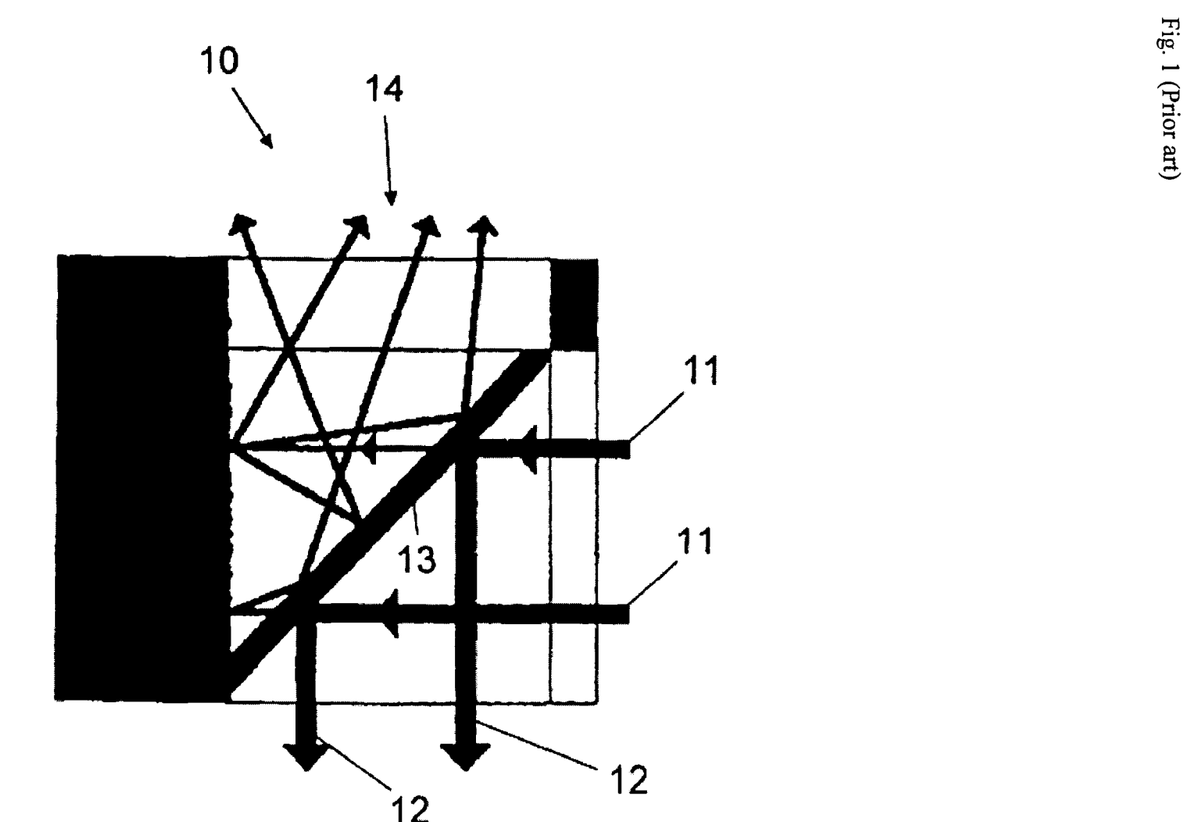
FIG. 1 shows in schematic representation a conventional coupling device according to the prior art without light trap.

A conventional coupling device 10, as is known in the prior art, is shown schematically in FIG. 1. A first beam path 11, for example, an illumination beam path, will be coupled to a second beam path 12, for example, an observation beam path, with coupling device 10, which has a deflecting element 13, for example, a beam splitter. In this case, the larger fraction of the first beam path 11 is not reflected at deflecting element 13, but rather passes through it. Since coupling device 10 according to FIG. 1 does not provide a light trap, scattered light 14 (stray light) emerges, which reaches the second beam path 12 in an undesired manner and there, for example, leads to a reduction of the image contrast.

Figure 2:
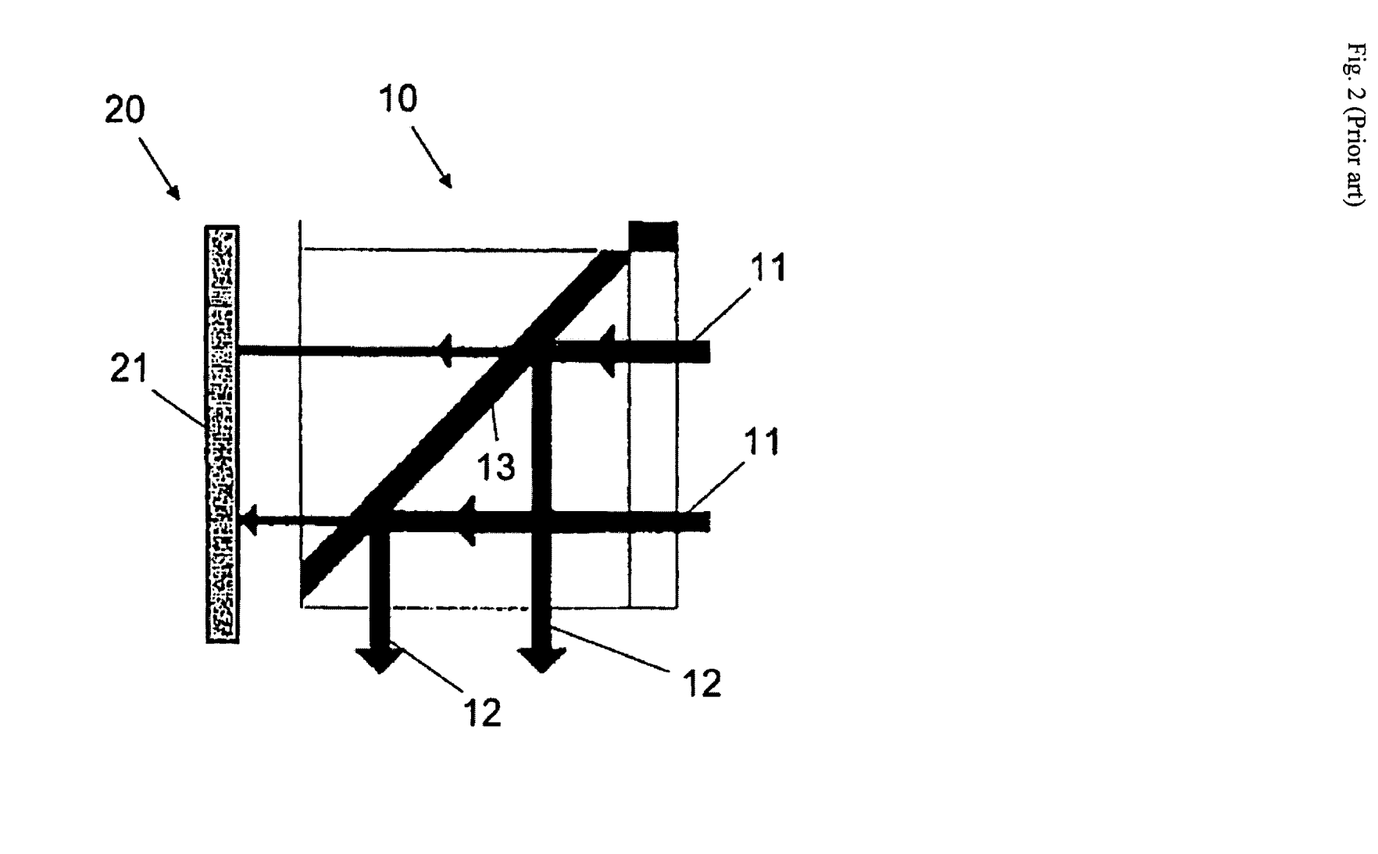
FIG. 2 shows in schematic representation a conventional coupling device according to the prior art with light trap.

In order to reduce the emergence of stray light, it has already become known in the prior art to utilize light traps. A known solution in this sense is shown in FIG. 2. Coupling device 10 shown in FIG. 2 corresponds in its basic structure to the coupling device shown in FIG. 1. This time, of course, a light trap 20 in the form of a neutral filter is provided behind deflecting element 13. The stray light passing through deflecting element 13 can be absorbed at least partially by this neutral filter 20.

The variant of a light trap 20 shown in FIG. 2, however, cannot be used for all applications. Thus, for example, it is not possible to apply such light traps to the epi-illumination of a microscope, e.g., an operating microscope or a stereomicroscope in general. Light fractions from the first beam path 11 still reach beam path 12, due to the degree of residual reflections of the filter elements used. Even small degrees of residual reflection are disruptive due to the high light intensity.

In order to circumvent these disadvantages, a light trap 20 is provided according to the present invention, as shown in FIGS. 3 to 6.

In each of FIGS. 3 to 6, an illumination device 30 for an optical observation device is shown, which can involve, for example, an operating microscope, e.g., for ophthalmic surgery, a stereomicroscope in general, or similar device. As can be seen particularly from FIGS. 3, 5 and 6, the optical observation device has an objective element 40. At least one observation beam path 41 is produced in the optical observation device.

Illumination device 30 is designed to produce a coaxial epi-illumination. Illumination device 30 has a device 31 for producing at least one illumination beam path 34. For this purpose, illumination device 30 can provide a number of optical elements 32, 33.

Illumination beam path 34 is coupled in the form of a coaxial epi-illumination to observation beam path 41, via a coupling device 10, which is a component of illumination device 30 in the embodiment examples. For this purpose, first a deflecting element 13, e.g., a beam splitter, is provided, which can be designed, for example, as a beam-splitting plate, as a partially light-transparent mirror, as a beam-splitting prism or similar element.

In addition to deflecting element 13, a light trap 20, which is designed in a special way, is provided after or behind deflecting element 13 in the direction of the beam in the examples shown according to FIGS. 3 to 6.

Figure 3:
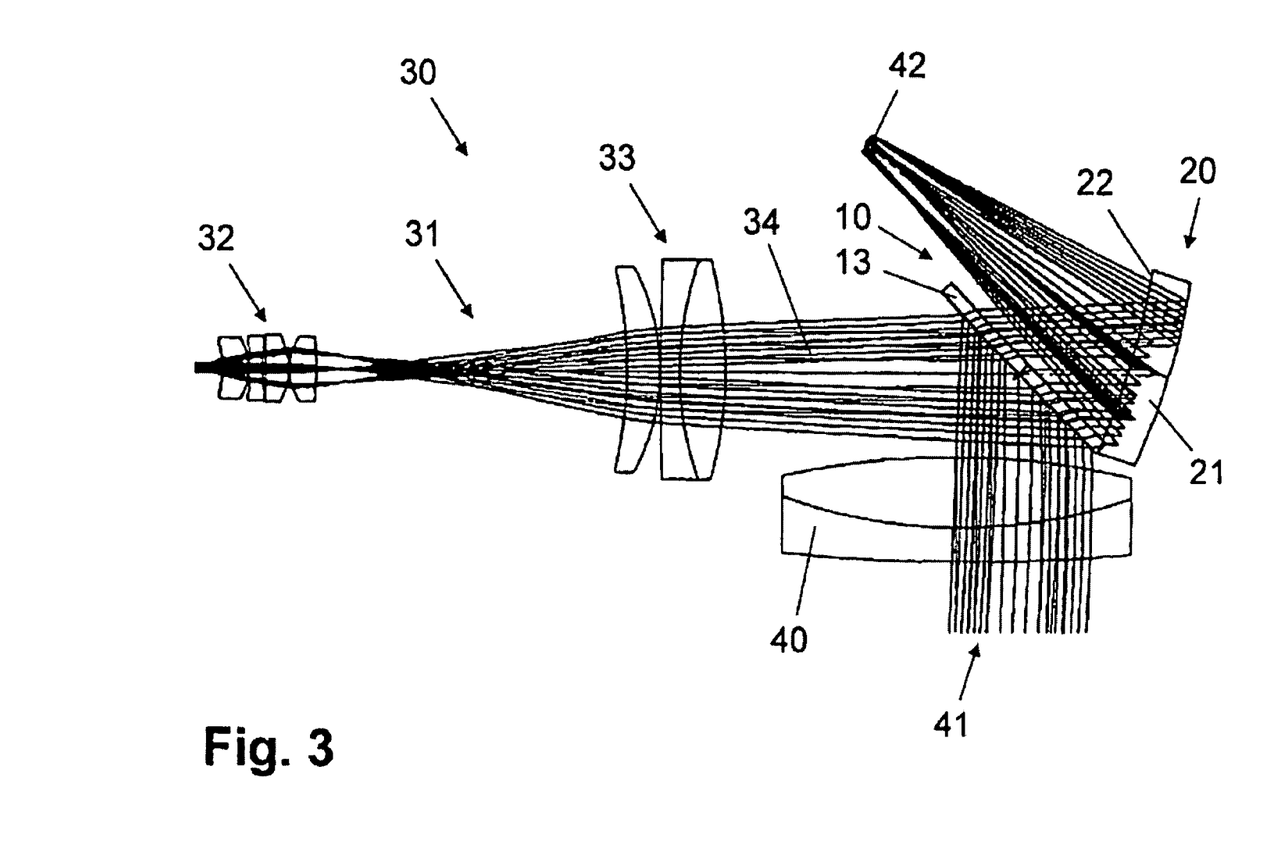
FIG. 3 in schematic representation shows a first example of embodiment of an optical observation device according to the invention having a light trap according to the invention.
Figure 5:
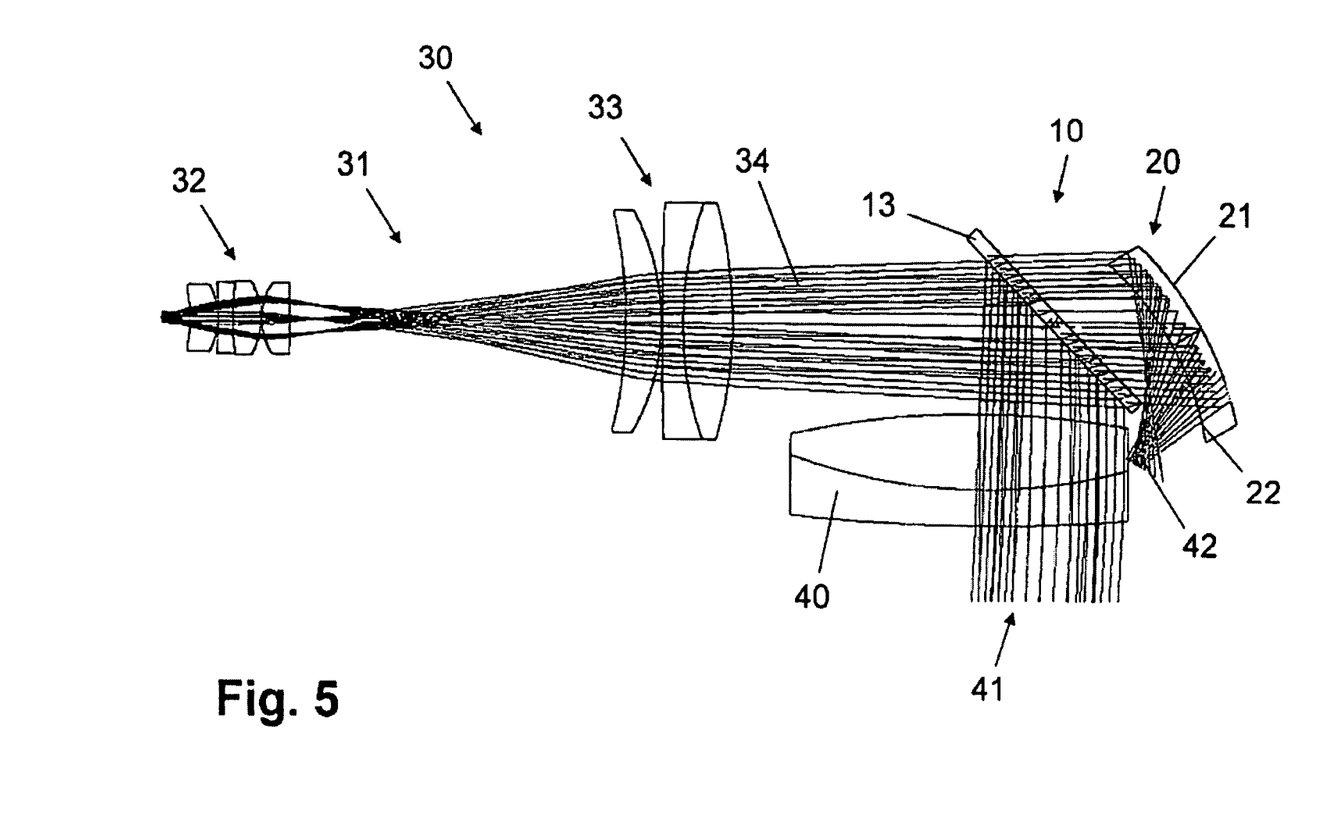
FIG. 5 in schematic representation shows a third example of embodiment of an optical observation device according to the invention having a light trap according to the invention.
Figure 6:
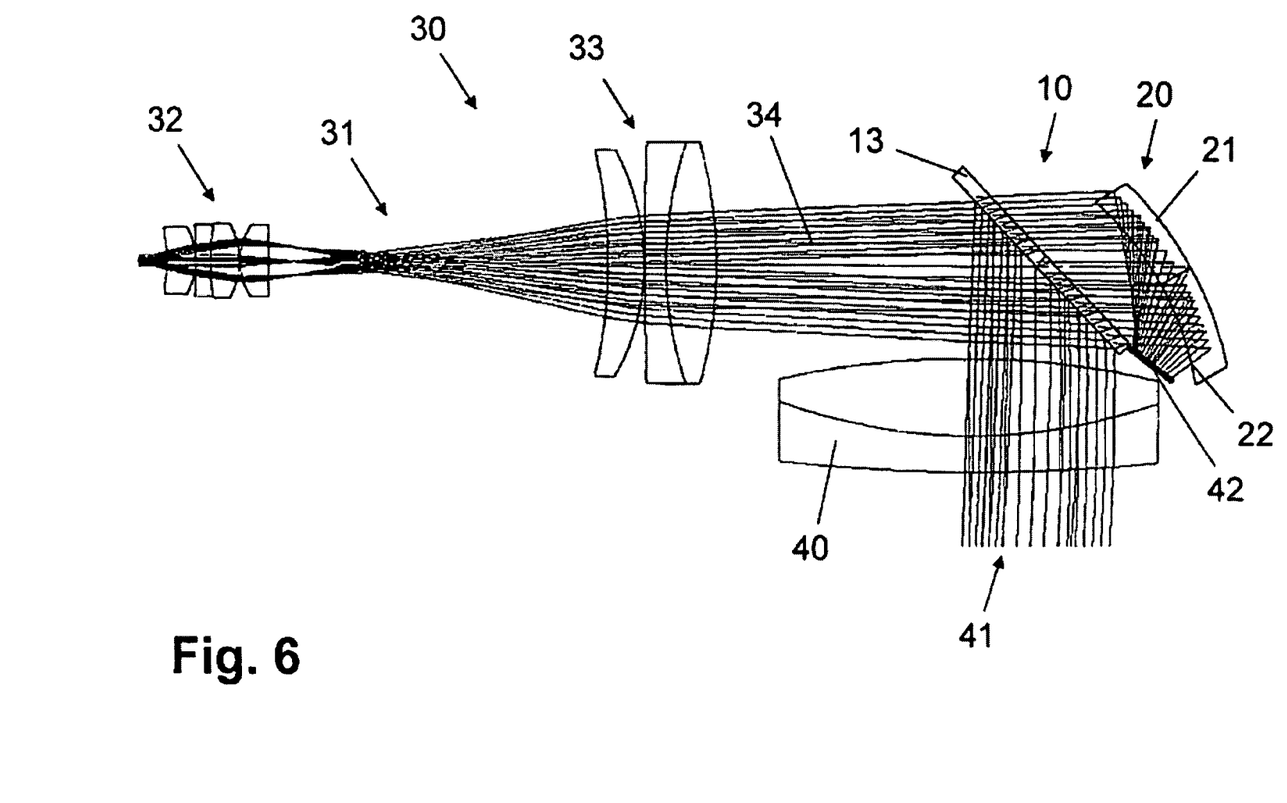
FIG. 6 in schematic representation shows a fourth example of embodiment of an optical observation device according to the invention having a light trap according to the invention.

Light trap 20 has a filter element 21 with a high degree of absorption of more than 80%; in the examples shown, this is a neutral filter element, whose incident light face 22 has a concave radius. The radius of curvature of the concave incident face 22 of light trap 20 advantageously lies between 25 mm and 200 mm, preferably between 45 mm and 110 mm. The light, which is reflected due to the degree of remaining reflections from incident face 22 of filter element 21, is collimated by means of the concave radius of incident light face 22 and is deflected via a tilting of filter element 21, preferably in two planes, to a suitable site 42, for example within the housing of the optical observation device, where it is not disruptive. This is shown in FIGS. 3, 5 and 6. By means of the collimation, no additional scattered light arises due to other optical or mechanical components.

In the example of embodiment shown in FIG. 3, the reflected beam is deflected upward to a suitable point 42. Advantageously, the curvature of incident face 22 of light trap 20 is selected such that the light spot at site 42 is as small as possible. This is influenced by a number of factors, in particular, by the extent of the path upon which the light can/must be bent back starting from incident face 22 to the corresponding site 42.

In the example shown in FIG. 3, this path is relatively long, so that incident face 22 in the example shown in FIG. 3 has a relatively long radius of curvature.

Figure 4:
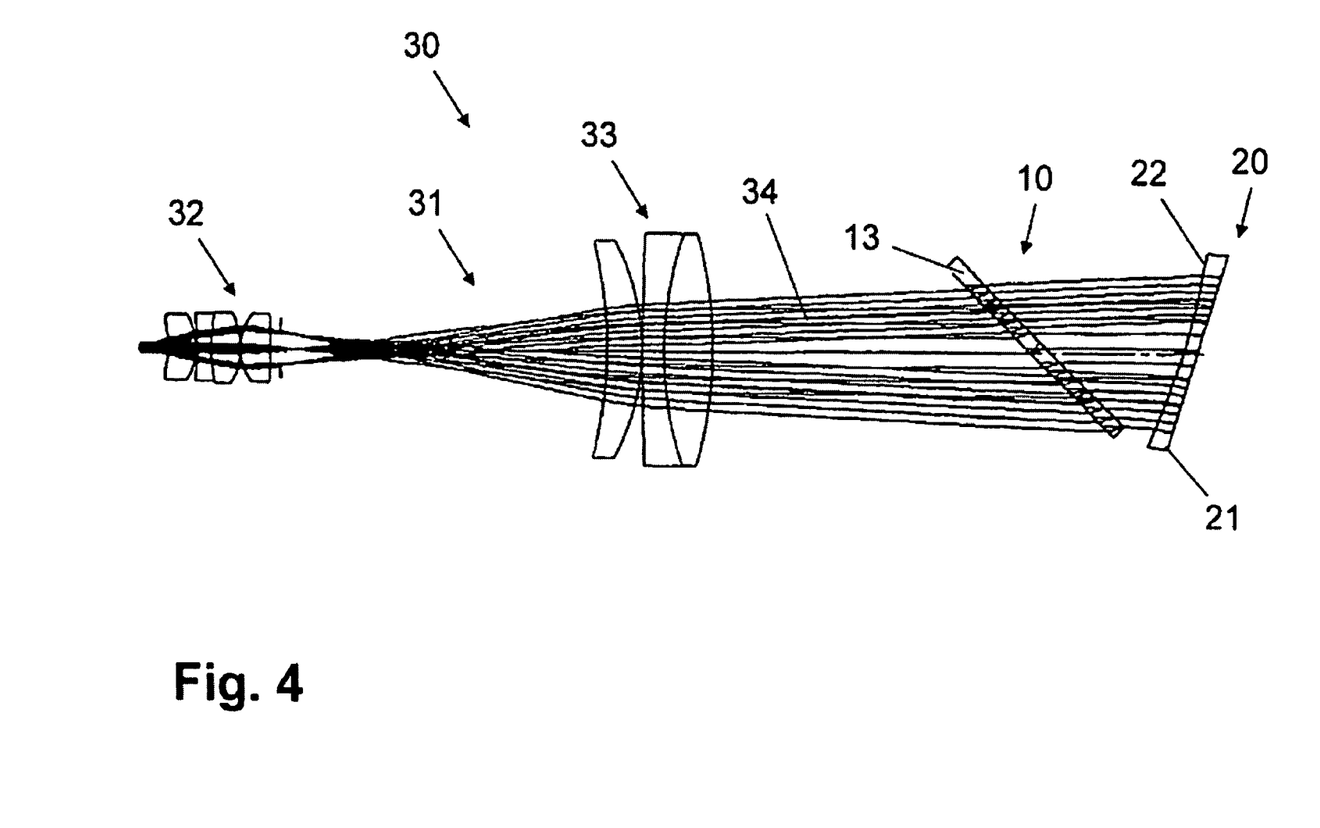
FIG. 4 in schematic representation shows a second example of embodiment of an optical observation device according to the invention having a light trap according to the invention.

The light, which enters into filter element 21, can also be absorbed completely by this element. An example of this is shown in FIG. 4.

In the examples shown in FIGS. 5 and 6, the reflected beam is deflected downward to a suitable site 42. In the two examples, the extent of the path upon which the light beam bends back is shorter than in the example shown in FIG. 3, so that incident face 22 in the examples shown in FIGS. 5 and 6, in comparison to FIG. 3, has a shorter radius of curvature.

In the example shown in FIG. 5, site 42 is found at a greater distance from beam splitter 13. In this example, site 42 lies closer to objective element 40.

In the example shown in FIG. 6, site 42, to which the light beam is deflected, is found in the direct vicinity of deflecting element 13, for example, directly next to deflecting element 13.

For example, a surface element 43 in the form of a special diaphragm can be provided in the region of special sites 42, as will be explained in more detail below.

Sections of an optical observation device 100, for example, an operating microscope, are shown in each of FIGS. 7 to 11, in which the illumination device according to the invention, in particular, the illumination device shown in FIG. 6, is implemented.

Figure 7:
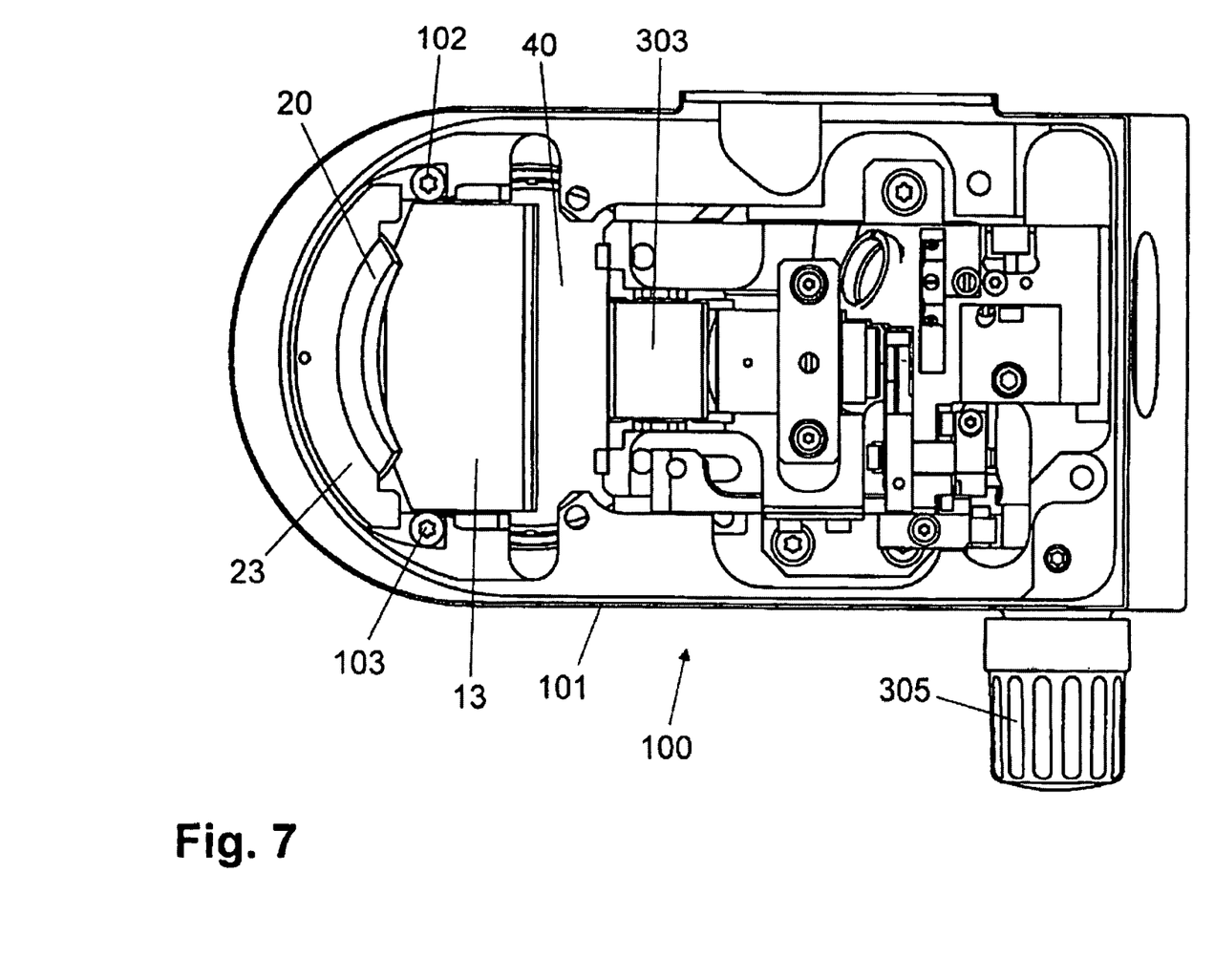
FIG. 7 shows a top view onto a section of an operating microscope, in which the fourth example of embodiment according to FIG. 6 is implemented.
Figure 8:
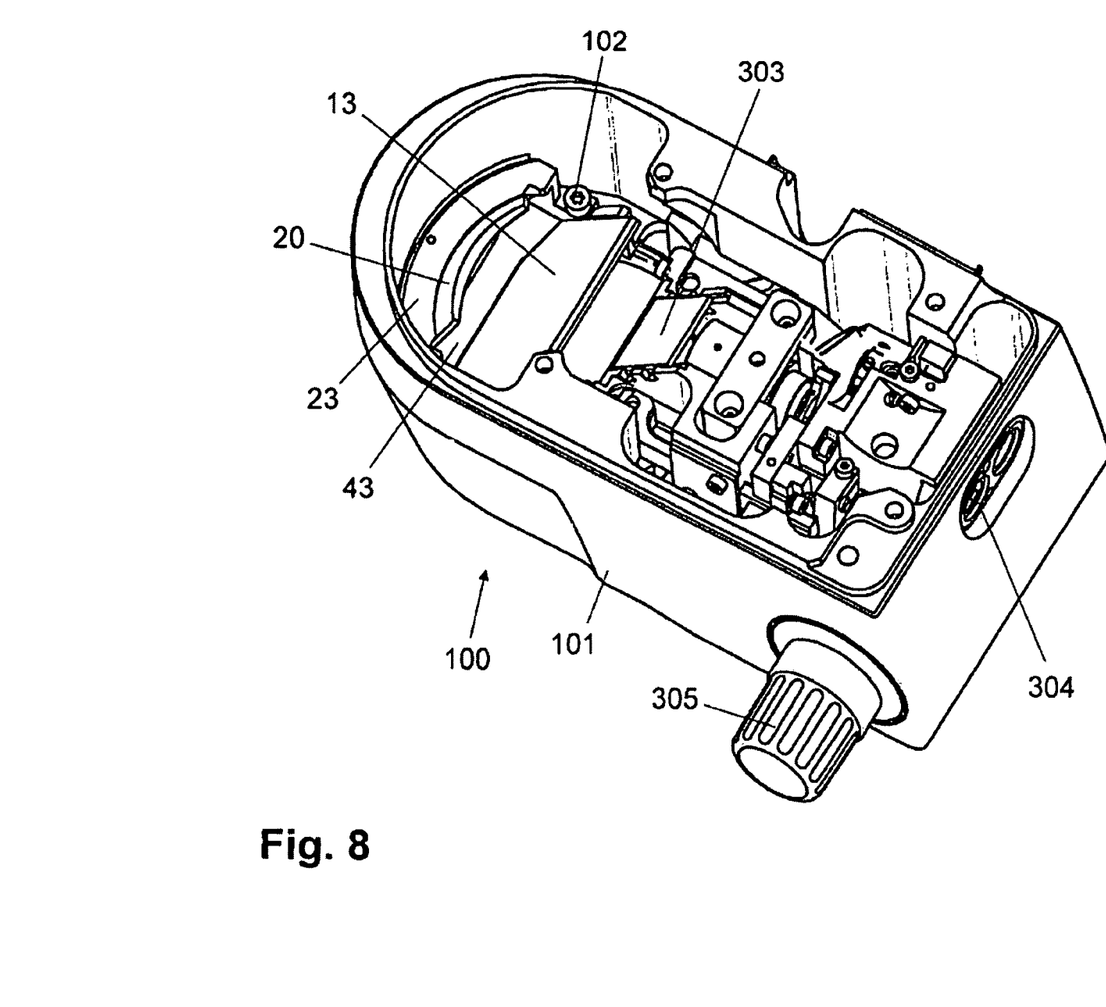
FIG. 8 shows a perspective view of the section of an operating microscope shown in FIG. 7.
Figure 9:
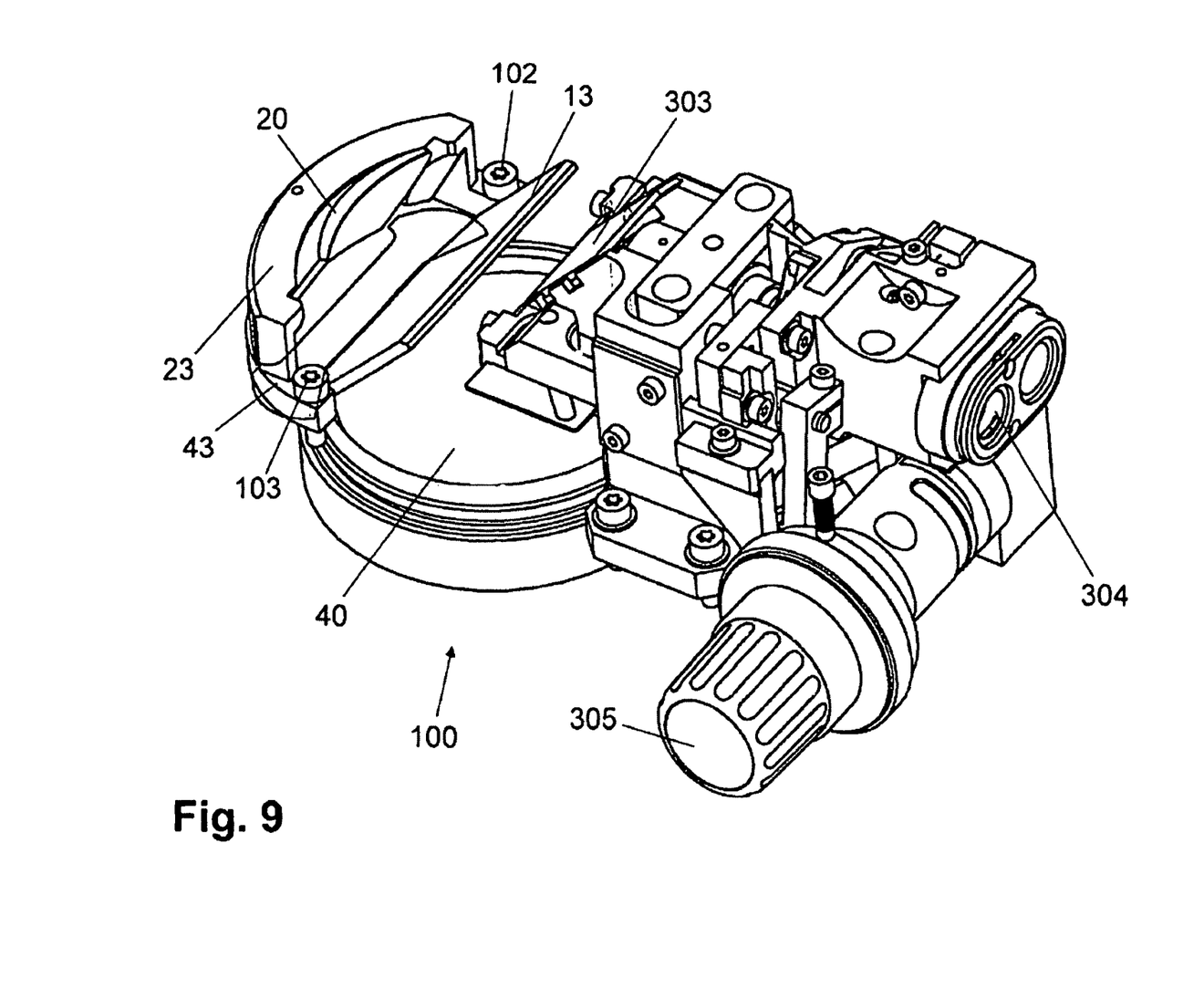
FIG. 9 shows a perspective view of the section of an operating microscope shown in FIG. 8, without housing.

FIGS. 7 and 8 show a section of operating microscope 100 having a base body 101; FIG. 9 shows the corresponding section without a base body. Operating microscope 100 contains an illumination system, which provides an illumination beam path to a deflecting element 13, which deflects the illuminating light through objective element 40, for example, the principal objective of the microscope, to the object region. The left and right observation beam paths 204, 205 of operating microscope 100 pass through deflecting element 13 (see FIG. 10 as well as FIG. 11). The illuminating light, which is not deflected from deflecting element 13 to the object region, reaches light trap 20. Light trap 20 is glued into an uptake 23 for the light trap and is in good thermal contact with it. Uptake 23 for the light trap in turn is rigidly attached to base body 101 of operating microscope 100 via fastening screws 102 and 103. This measure ensures that light trap 20 is thermally coupled to base body 101 of operating microscope 100. The heat, which is triggered by the illuminating light striking the light trap 20, can be easily drawn off in this way into base body 101 of operating microscope 100.

As can be seen from FIGS. 8, 9 10 and 11, a surface element 43 in the form of a metal diaphragm, which is allotted to light trap 20, is found in the present illumination system. The illuminating light, which reaches light trap 20 through deflecting element 13, as long as it is not absorbed by light trap 20, is deflected to metal diaphragm 43. Metal diaphragm 43 partially covers principal objective 40 of the microscope. In this way, one avoids disruptive reflections, which are due to light that is reflected by light trap 20, from occurring at principal objective 40 of the microscope.

The form of the surface of light trap 20, i.e., its curvature, is selected such that the illuminating light that strikes light trap 20 is reflected only to diaphragm 43.

Figure 10:
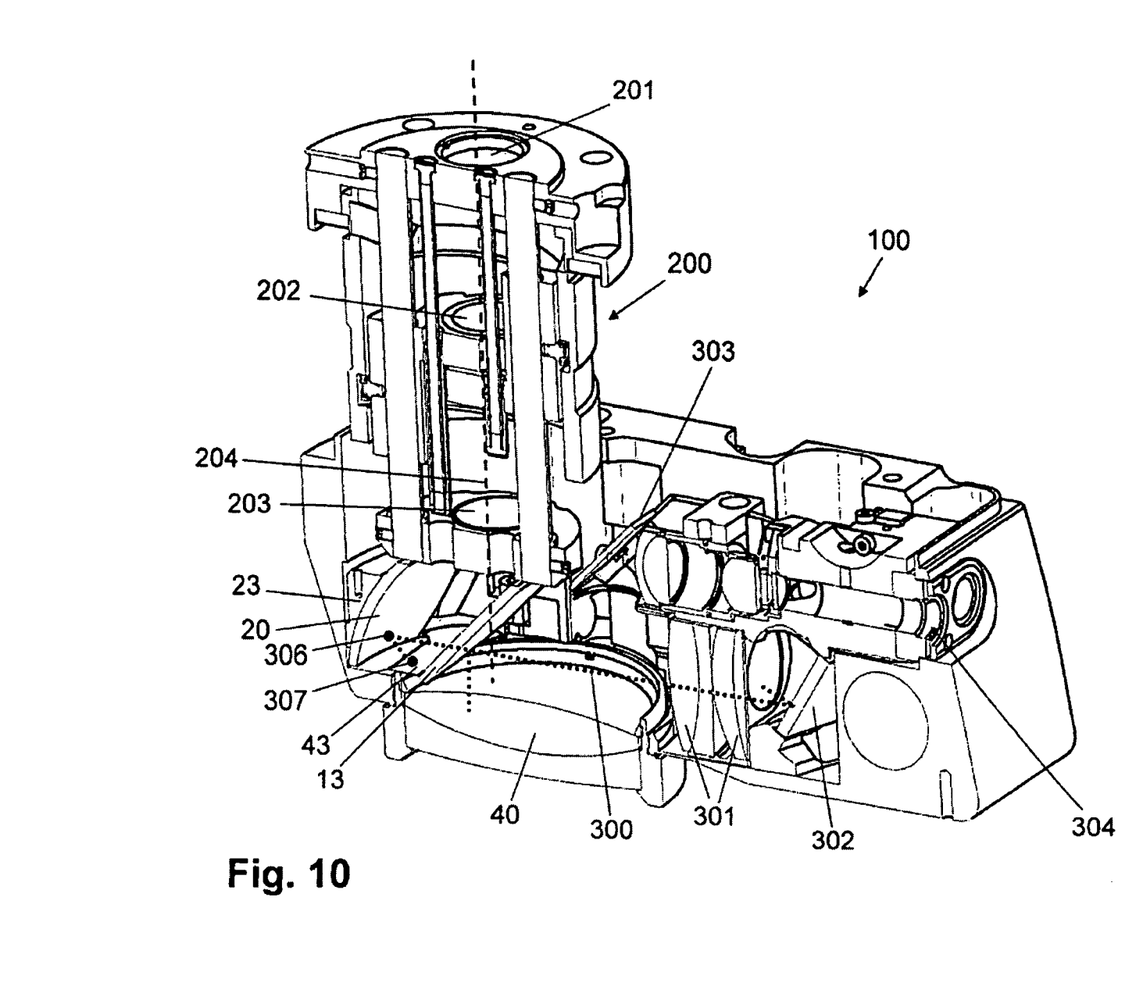
FIG. 10 shows a perspective view of the section of an operating microscope shown in FIG. 7, having a pancratic system.
Figure 11:
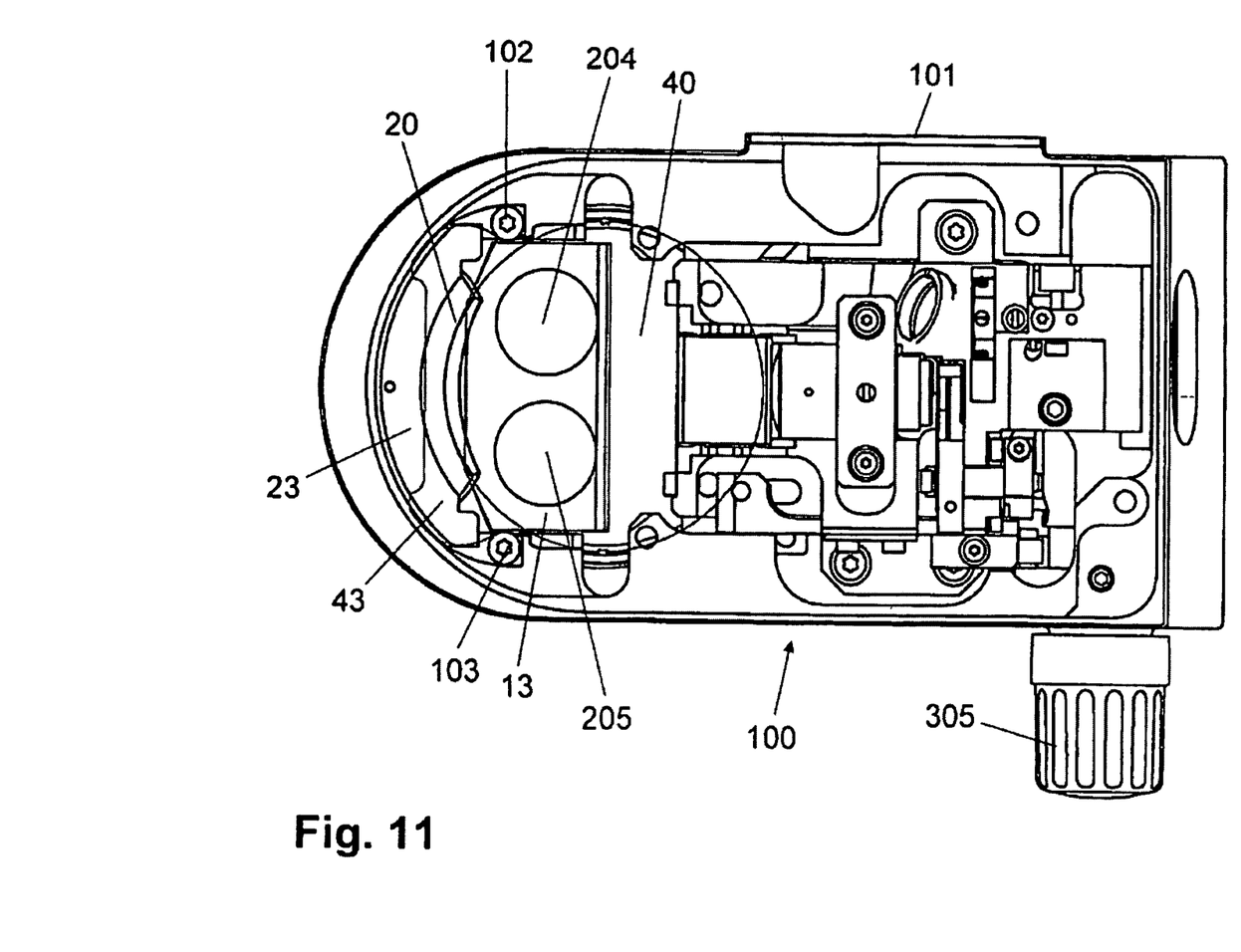
FIG. 11 shows a top view onto a section of an operating microscope according to FIG. 7, in which the observation beam paths pass through the deflecting element.

FIG. 10 shows a section of operating microscope 100 with a pancratic system 200, which has lens elements 201, 202 and 203 for an observation beam path with optical axis 204. The illumination system provides an illumination beam path 300. The illumination system has an illumination optics 301 and comprises mirror units 302 and 303 (see also FIGS. 7 to 9), which deflect the light, which is introduced by a light guide that [is found] in an uptake space 304 for the light guide, to deflecting element 13. Mirror units 302, 303 are adjusted by turning a knob 305.

As is further shown in FIG. 10, light trap 20 has a spherically curved surface. The optical axis of illumination beam path 300 strikes an incident point 306 on the incident light face of the light trap and is partially reflected back from there. The reflection is directed to a focal point 307 on diaphragm 43. The steeper the curvature of the incident light face of light trap 20 is, the shorter the distance is between focal point 307 and light trap 20. The distance advantageously involves the distance between focal point 307 and incident point 306, at which the optical axis of illumination beam path 300 passes through the surface of the incident light face of light trap 20. With a radius of curvature r for light trap 20, the distance between incident point 306 and focal point 307 advantageously can amount to r/2.

As can be seen in FIG. 10, light trap 20 is tilted in the X/Z plane relative to the optical axis of illumination beam path 301*. In the example shown, a tilting downward is provided. This means that the surface normal line for the surface of the incident light face of light trap 20 is tilted down by a specific angle, which is advantageously an angle of 30 degrees in the example shown, at incident point 306 relative to the optical axis of illumination beam path 300. A tilting in the X/Y plane, i.e., to the left or right, is basically also possible, but is not provided in the example shown.

* sic; illumination beam path 300?—Trans. Note.

LIST OF REFERENCE NUMERALS

10 Device for coupling a first beam path to a second beam path
11 First beam path
12 Second beam path
13 Deflecting element
14 Stray light
20 Light trap
21 Filter element (neutral filter)
22 Incident light face
23 Uptake device for the light trap
30 Illumination device
31 Device for generating an illumination beam path
32 Optical elements
33 Optical elements
34 Illumination beam path
40 Objective element
41 Observation beam path
42 Site in the housing of the observation device
43 Surface element (diaphragm)
100 Operating microscope
101 Base body
102 Fastening screw
103 Fastening screw
200 Pancratic system
201 Lens element
202 Lens element 203 Lens element
204 Observation beam path
205 Observation beam path
300 Illumination beam path
301 Illumination optics
302 Mirror unit
303 Mirror unit
304 Uptake space for the light guide
305 Turning knob
306 Incident point
307 Focal point

The invention claimed is:

1. A light trap for eliminating stray light, having a filter element, in particular, a neutral filter element, is characterized in that the light trap is adapted for use in a surgical microscope, in that the incident light face of the filter element has a concave radius and in that the radius of curvature of the incident light face lies in the range of 45 mm to 110 mm.

2. The light trap according to claim 1, further characterized in that the filter element is composed of an absorption material, at least in regions, or that at least the incident light face is provided with an absorption material, at least in regions.

3. A device for coupling a first beam path to a second beam path, having a deflecting element and a light trap provided in the region of the deflecting element, hereby characterized in that the device is adapted for use in a surgical microscope and in that the light trap is designed according to claim 1.

4. The coupling device according to claim 3, further characterized in that the deflecting element is designed as a partially transparent mirror or as a beam-splitting prism.

5. The coupling device according to claim 3, further characterized in that the light trap is disposed after the deflecting element.

6. The coupling device according to claim 3, further characterized in that the light trap is tilted in at least one plane, preferably in two planes.

7. The coupling device according to claim 3, further characterized in that the filter element is designed or disposed is such a way that light rays reflected back from the incident light face of the filter element travel past the deflecting element.

8. The coupling device according to claim 3, further characterized in that a surface element is provided for focussing light rays reflected back from the incident light face of the filter element.

9. The coupling device according to claim 3, further characterized in that it is designed as a device for coupling an illumination beam path to an observation beam path, in particular, for coupling a coaxial epi-illumination to an observation beam path.

10. The coupling device according to claim 3, wherein the light trap is oriented relative to the deflecting element so that light reflected off the incident light face of the light trap does not pass through the deflecting element.

11. An illumination device, having a device for generating at least one illumination beam path and having a device for coupling at least one illumination beam path to at least one observation beam path, hereby characterized in that the illumination device is adapted for use in a surgical microscope, in that the coupling device for coupling a first beam path to a second beam path is designed in such a way that the coupling device has a deflecting element and a light trap provided in the region of the deflecting element, in that the light trap has a filter element, particularly a neutral filter element, in that the incident light face of the filter element has a concave radius, and in that the radius of curvature of the incident light face lies in the range of 45 mm to 110 mm.

12. A surgical microscope having a base body and an illumination device, which provides at least one illumination beam path to a deflecting element, which deflects the illuminating light through an objective element to an object plane, hereby characterized in that the illumination device is adapted for use in a surgical microscope and is designed according to claim 11.

13. The microscope according to claim 12, further characterized in that the light trap of the coupling device of the illumination device is thermally coupled to the base body of the optical observation device.

14. The microscope according to claim 12, further characterized in that the surface element of the coupling device is provided in the region of the objective element of the optical observation device.

15. The illumination device according to claim 11, wherein the light trap is oriented relative to the deflecting element so that light reflected off the incident light face of the light trap does not pass through the deflecting element.

16. The microscope according to claim 12, wherein the light trap is oriented relative to the deflecting element so that light reflected off the incident light face of the light trap does not pass through the deflecting element.

* * * * *